United States Patent Office 3,440,196
Patented Apr. 22, 1969

3,440,196
COATING SOLUTIONS AND METHODS FOR
PREPARING AND USING THE SAME
Edith M. Boldebuck, Schenectady, and Fred F. Holub, Scotia, N.Y., assignors to General Electric Company, a corporation of New York
No Drawing. Filed May 5, 1966, Ser. No. 547,776
Int. Cl. C08g 20/20, 20/32
U.S. Cl. 260—29.2                    12 Claims

ABSTRACT OF THE DISCLOSURE

Water coating solutions are produced by forming in water a mixture of ingredients comprising benzophenonetetracarboxylic acid and an aliphatic diamine containing 2 to 8 carbon atoms or a mixture of aliphatic diamines containing 2 to 8 carbon atoms with m-phenylenediamine and allowing these materials to interact at temperatures below 75° C. Homogenous, stable solutions are formed when the molar amounts of the amines are equal to or up to 65% in excess of the molar concentrations of the benzophenonetetracarboxylic acid.

---

This invention relates to synthetic polymer compositions and methods of preparing such materials. More particularly, the invention is concerned with a process for making a coating solution which comprises (1) forming in water a mixture of ingredients comprising (a) benzophenonetetracarboxylic acid, and (b) at least one diamine selected from the group consisting of (i) $C_{2-8}$ alkylenediamines, and (ii) a mixture of $C_{2-8}$ alkylenediamines and m-phenylenediamine, and (2) allowing the reactants to interact at a temperature below 75° C. to form a homogenous, stable solution convertible by heat to a polymeric resin, with the proviso that (A) when the homogenous solution is made, at least equimolar to 65 percent excess molar concentrations of the diamine over the benzophenonetetracarboxylic acid are employed. The invention includes also the formation of polymers and polymeric films through the subsequent application of heat.

It would be desirable to form a coating solution in an inexpensive solvent if the solution became homogenous and a stable solution by interaction of the reactants at a temperature below 75° C. to permit the use of the solution for coating purposes. After coating a substrate, the solution would be readily converted to the polymeric form by chemical or thermal means to produce products having excellent solvent resistance and resistance to flow at elevated temperatures.

Unexpectedly it has been discovered that it is possible to prepare homogenous coating solutions of benzophenonetetracarboxylic acid and aliphatic diamines or mixtures of aliphatic diamines and m-phenylenediamine in water, which on heating yield high melting polymers and polymeric films. These coating solutions are made homogenous by the addition of at least equimolar to 65 percent excess molar concentrations of the diamine over the benzophenonetetracarboxylic acid (BPTA). This was entirely unexpected and in no way could have been predicted because BPTA has low solubility in water.

The various diamines which have been found useful for reacting with the above benzophenonetetracarboxylic acid are the various alkylenediamines, especially those in which the alkyl group contains from two to eight carbon atoms, e.g., ethylenediamine, propylenediamine, butylenediamine, 2-methylpropylenediamine, 1,3-diaminobutane, 1,3-diaminopropane, pentamethylenediamine, hexamethylenediamine, octamethylenediamine, etc. Mixtures of the above alkylenediamines, and mixtures of these diamines with m-phenylenediamine are also useful in this invention. In the latter mixtures, from 2 to 98 percent of the alkylenediamines can be mixed with m-phenylenediamine.

In forming the polymeric products it is only required to mix the above benzophenonetetracarboxylic acid with one or more of the above named diamines in the presence of the water solvent at a temperature below 75° C.; they go rapidly into solution and remain liquid and homogenous. The solution is then shaped and heated to a temperature of at least 250° C. If desired, an inert atmosphere, e.g., nitrogen, can be used in the reaction vessel to retard oxidation of the amines to produce lighter colored polymers.

The amount of water used should be sufficient to produce a homogenous solution with the reactants, and yet not be too viscous so as to introduce handling problems. Optimum concentrations are in the range of 5 to 50 percent, by weight, reactants and 50 to 95 percent, by weight solvent mixture, based on the end-use. In carrying out the reaction, it is preferable to add the diamine to the water with stirring after which the acid is added and stirred at a temperature below 75° C. to solublize the system.

In order that those skilled in the art may better understand how the invention may be practiced, the following examples are given by way of illustration and not by way of limitation.

EXAMPLE 1

In this example, 2.50 grams hexamethylenediamine (HMDA) was added to 10.0 grams water after which 7.18 grams 3,3′, 4,4′ - benzophenonetetracarboxylic acid (BPTA) was added and stirred at room temperature to form a clear solution, which remains stable at 25° C. The mole ratio of the diamine to the acid was 1.08 while the percent solids was 49. A sample of this solution was heated on a glass substrate to 300° C. to form a hard, tough polymeric film.

EXAMPLES 2-4

In these examples, various diamines were interacted below 75° C. with BPTA as set forth in Example 1. In the examples, EDA is ethylenediamine, 1,3-BDA is 1,3-diaminobutane, 1,3-PrDA is 1,3-diaminopropane. A sample of each solution was heated to 300° C. on a glass substrate to form a hard, tough polymeric film. Table 1 sets forth the ingredients, amounts of ingredients, mole ratios, percent solids, type of solution, and temperature at which the solution is stable.

TABLE 1

| Example | Acid | | Diamine | |
|---|---|---|---|---|
| | Type | Grams | Type | Grams |
| 2 | BPTA | 7.18 | HMDA | 1.16 |
| | | | EDA | 0.60 |
| 3 | BPTA | 7.18 | HMDA | 1.16 |
| | | | 1,3-BDA | 0.88 |
| 4 | BPTA | 3.58 | 1,3-PrDA | 0.74 |

| Example | Water, grams | Moles Diamine/ moles BPTA | Percent Solids | Solution | |
|---|---|---|---|---|---|
| | | | | Type | Temp., °C. |
| 2 | 10.0 | 1.00 | 47 | Clear | 65 |
| 3 | 10.0 | 1.00 | 48 | do | 25 |
| 4 | 4.3 | 1.00 | 49 | do | 40 |

EXAMPLES 5-12

In each of these examples, 3.58 grams BPTA were interacted below 75° C. with various mole ratios of m-phenylenediamine (m-PDA) and HMDA as set forth in Example 1. A sample of each clear, stable solution was heated on aluminum foil for three minutes at 250° C. to form a flexible, adherent polymeric film. Table 2 sets forth below the ingredients, amounts of ingredients, mole ratios, type of solution, percent solids, and temperature at which the solution is stable.

TABLE 2

| Example | Grams m-PDA | Grams HMDA | Grams water | Moles diamine/ moles BPTA |
| --- | --- | --- | --- | --- |
| 5 | 0.27 | 0.87 | 10.06 | 1.0 |
| 6 | 0.81 | 0.31 | 2.86 | 1.02 |
| 7 | 0.93 | 0.22 | 10.07 | 1.05 |
| 8 | 0.54 | 0.68 | 5.03 | 1.09 |
| 9 | 0.67 | 0.72 | 5.01 | 1.24 |
| 10 | 0.54 | 1.11 | 5.03 | 1.46 |
| 11 | 0.81 | 0.98 | 3.08 | 1.60 |
| 12 | 0.93 | 0.91 | 21.41 | 1.65 |

| Example | Mole ratio m-PDA/HMDA | Percent solids | Temp., °C., for stable solution |
| --- | --- | --- | --- |
| 5 | 25/75 | 32 | 65 |
| 6 | 74/26 | 62 | 45 |
| 7 | 82/18 | 32 | 64 |
| 8 | 46/54 | 49 | 45 |
| 9 | 50/50 | 50 | 45 |
| 10 | 34/66 | 51 | 65 |
| 11 | 47/53 | 37 | 25 |
| 12 | 52/48 | 20 | 25 |

Although the utility of the coating solutions of the present invention have been described in the above-mentioned patent principally in terms of applications as flexible films, it should be understood that these polymers may be used in other applications suitable for such compositions. Thus, these polymers can be employed as insulation over a conducting core. Additionally, these polymers can be employed over a conducting core previously coated with another polymer, or vice versa, to give laminated, insulated coatings on the core to improve the properties of the insulation. They may also be used as dipping varnishes to impregnate coils of previously insulated wire, i.e., in the motor and generator rotors, field coils, etc. These polymers may also be used in molding powder formulations, by mixing with various fillers, for example, wood flour, diatomaceous earth, carbons, silica, abrasive grains, e.g., carborundum, diamond grit, etc. These polymers are also useful as impregnants, and bonding materials for metallic and fibrous laminates, etc. The polymers in film form are suitable as a dielectric in making capacitors, as slot insulation in motors, etc.

It has been found that in accordance with the process herein described that it is possible to form coating solutions in water which are subsequently heated to produce polymers and polymeric films. This simple direct process allows the preparation of coating solutions that are easily prepared and have greater flexibility on application to glass and metal surfaces. Since substantially no heating is required to form the coating solution, very simple mixing technique may be applied to produce a solution useful for bonding glass fibers, for making laminations and for coating metal substrates for use as thermal and electrical insulating films.

It will of course be apparent to those skilled in the art that other diamines may be employed in place of those recited in the foregoing examples, many illustrations of these reactants being given previously, without departing from the scope of the invention. The ratio of reactants as well as the proportions of the solvent may also be varied within the ranges set forth above. It is also to be understood that the conditions of reaction, formation of the coating solution, and of the ultimate polymeric product can also be varied widely in accordance with the intended invention. The incorporation of other additives such as light stabilizers, oxidation inhibitors, levelling additives, etc., is not precluded.

What we claim as new and desire to secure by Letters Patent of the United States is:

1. The process of making a coating solution which consists essentially of (1) forming in water a mixture of ingredients comprising (a) 3,3',4,4'-benzophenonetetracarboxylic acid, (b) at least one diamine selected from the group consisting of (i) $C_{2-8}$ alkylenediamines and (ii) a mixture of $C_{2-8}$ alkylenediamines and m-phenylenediamine, and (2) allowing the reactants to interact at a temperature below 75° C. to form a homogenous, stable solution convertible by heat to a polymeric resin, with the proviso that (A) when the homogenous solution is made, at least equimolar to 65 percent excess molar concentrations of the diamine over the 3,3',4,4'-benzophenonetetracarboxylic acid are employed and that said water comprises from 50 to 95 weight percent of the total weight of the ingredients.

2. A process as in claim 1, wherein the diamine is hexamethylenediamine.

3. A process as in claim 1, wherein the diamine is 1,3-diamino butane.

4. A process as in claim 1, wherein the diamine is 1,3-diamino propane.

5. A process as in claim 1, wherein the diamines are ethylenediamine and hexamethylenediamine.

6. A process as in claim 1, wherein the diamines are hexamethylenediamine and m-phenylenediamine.

7. A coating solution consisting essentially of (1) a mixture of ingredients comprising (a) 3,3',4,4'-benzophenonetetracarboxylic acid, (b) at least one diamine selected from the group consisting of (i) $C_{2-8}$ alkylenediamines in at least equimolar to excess molar concentrations over (1)(a), and (ii) a mixture of $C_{2-8}$ alkylenediamines and m-phenylenediamines in at least equimolar to 65 percent excess molar concentrations over (1) (a), and (2) water, said water comprising from 50 to 95 weight percent of the total weight of the ingredients.

8. A composition as in claim 7, in which the diamine is hexamethylenediamine.

9. A composition as in claim 7, in which the diamine is 1,3-diamino butane.

10. A composition as in claim 7, in which the diamine is 1,3-diamino propane.

11. A composition as in claim 7, in which the diamines are ethylenediamine and hexamethylenediamine.

12. A composition as in claim 7, in which the diamines are hexamethylenediamine and m-phenylenediamine.

References Cited

UNITED STATES PATENTS

| | | | |
| --- | --- | --- | --- |
| 2,710,853 | 6/1955 | Edwards et al. | 260—78 |
| 2,880,230 | 3/1959 | Edwards et al. | 260—78 |
| 2,902,475 | 9/1959 | Burkhard | 260—78 |
| 2,989,495 | 6/1961 | Hare et al. | 260—29.2 |
| 3,190,856 | 6/1965 | Lavin et al. | 260—65 |
| 3,242,136 | 3/1966 | Endrex | 260—47 |

SAMUEL H. BLECH, *Primary Examiner.*

J. T. GOOLKASIAN, *Assistant Examiner.*

U.S. Cl. X.R.

117—161, 218, 232; 161—214; 252—63.2; 260—9, 37, 78